US005815666A

United States Patent [19]

Kurihara

[11] Patent Number: 5,815,666

[45] Date of Patent: Sep. 29, 1998

[54] INFORMATION SUPPLY SYSTEM

[75] Inventor: Akira Kurihara, Tokyo, Japan

[73] Assignee: Sony Corporation, Tokyo, Japan

[21] Appl. No.: 651,749

[22] Filed: May 22, 1996

[30] Foreign Application Priority Data

May 30, 1995 [JP] Japan .................................... 7-131381

[51] Int. Cl.[6] ........................................ G06F 19/00

[52] U.S. Cl. .................................... 395/200.61; 395/200.3

[58] Field of Search ......................... 395/200.01, 200.09, 395/200.12, 682, 128, 345, 681, 200.61, 200.3

[56] References Cited

U.S. PATENT DOCUMENTS

| | | | |
|---|---|---|---|
| 5,339,433 | 8/1994 | Frid-Nielson | 395/700 |
| 5,367,621 | 11/1994 | Cohen et al. | 395/154 |
| 5,375,068 | 12/1994 | Palmer et al. | 364/514 |
| 5,442,749 | 8/1995 | Northcutt et al. | 395/200 |
| 5,572,643 | 11/1996 | Judson | 395/793 |

*Primary Examiner*—Robert B. Harrell
*Assistant Examiner*—Saleh Najjar
*Attorney, Agent, or Firm*—Frommer Lawrence & Haug LLP; William S. Frommer

[57] ABSTRACT

When a memory card in which characteristic information of a user is recorded is inserted in step S11, the characteristic information is read out in step S12, and the attributes of information are retrieved in step S13. A priority is set in the information on the basis of the attributes of the information and the characteristic information in step S14, and information is added in an ascending order of the priority to an index. A check is made in step S16 to determine if the end of information has been reached. When the end of the information has not been reached, the process returns to step S13, and when the end of the information has been reached, the index is displayed in step S17. In step S18, the user selects and obtains desired information. In this way, a priority can be set in the information according to the tastes and characteristics of the user and the attributes of a display terminal, and only the desired information can be obtained quickly.

20 Claims, 7 Drawing Sheets

INFORMATION SUPPLY SYSTEM

BACKGROUND OF THE INVENTION

1. Field of the Invention

The present invention relates to an information supply system and, more particularly, to an information supply system for supplying multimedia information, such as video or music, together with text information.

2. Description of the Related Art

A conventional information supply system has been realized as a database system or a personal computer communications system in which terminals and the information provider are connected to each other by using a telephone line or the like, from which system information desired by the user is retrieved. In such a case, the transmission of information is performed in response to a request from the user. In contrast to this system, in a broadcasting type service, regardless of requests from users, the same information is sent out in one direction to the users according to the intention of the information proper.

However, in the above-described conventional method, the former case has a problem in that new information cannot be obtained until the user makes a request, and the information which can be obtained by the user, of the information stored by the information provider, is limited substantially to a very small portion of such information. The latter case has a problem in that since information is sent out in one direction regardless of the request of the user, when a large amount of information is sent out it takes a great deal of time and effort for the user to obtain useful information from the broadcasting type service.

In another example, Japanese Patent Laid-Open No. 4-129137 discloses technology for adding display attributes of data to display data. However, the attributes are limited to the display format or the like, and effective classification of a great variety of data is not easy. Further, when the storage capacity of the terminal is small, it is physically difficult to record all received information.

SUMMARY OF THE INVENTION

The present invention has been achieved in view of the above-described situation. It is an object of the present invention to provide an information supply system which is capable of selectively recording information required by the user on the basis of the characteristics and tastes of the user from among the received information and which is capable of efficiently obtaining desired information by the user.

To achieve the above-described object, according to one aspect of the present invention, there is provided an information supply system which comprises: a server for providing information, terminals for receiving the information from the server via a transmission medium, the server including: addition means for adding classification information corresponding to the type and importance of data to the information; storage means for storing a plurality of the information to which the classification information has been added by the addition means; and transmission means for transmitting to the terminal a plurality of the information to which the classification information has been added and which has been stored in the storage means, and the terminal including: receiving means for receiving the information from the server; display means for displaying the information; storage means for storing the information; and setting means for setting a priority corresponding to the contents of the classification information in the information.

According to another aspect of the present invention, there is provided a method of providing information in an information supply system which comprises: a server for providing information; and terminals for receiving the information from the server via a transmission medium, the method comprising in the server: an addition step of adding classification information corresponding to the type and importance of data to the information; a storing step of storing a plurality of the information to which the classification information has been added in the addition step; and a transmission step of transmitting to the terminal a plurality of the information to which the classification information has been added and which has been stored in the storing step, and the method comprising in the terminal: a receiving step of receiving the information from the server; a display step of displaying the information; a storing step of storing the information; and a setting step of setting a priority corresponding to the contents of the classification information in the information.

In the information supply system of the present invention, classification information is added to information by addition means of a server, information to which classification information has been added is stored by the storage means, and information to which classification information has been added and which has been stored by the storage means is transmitted by transmission means. Therefore, it is possible to easily recognize the contents of the information.

In the information supply system of the present invention, a priority is set in the information by setting means, predetermined information from the server is selectively stored in the storage means on the basis of such priority by control means, and the information from the server is selectively displayed on the basis of such priority. Therefore, it is possible to vary the method of storing information and the method of displaying such information.

The above and further objects, aspects and novel features of the invention will become more apparent from the following detailed description when read in connection with the accompanying drawings.

DETAILED DESCRIPTION OF THE PREFERRED EMBODIMENT

Figure 1:
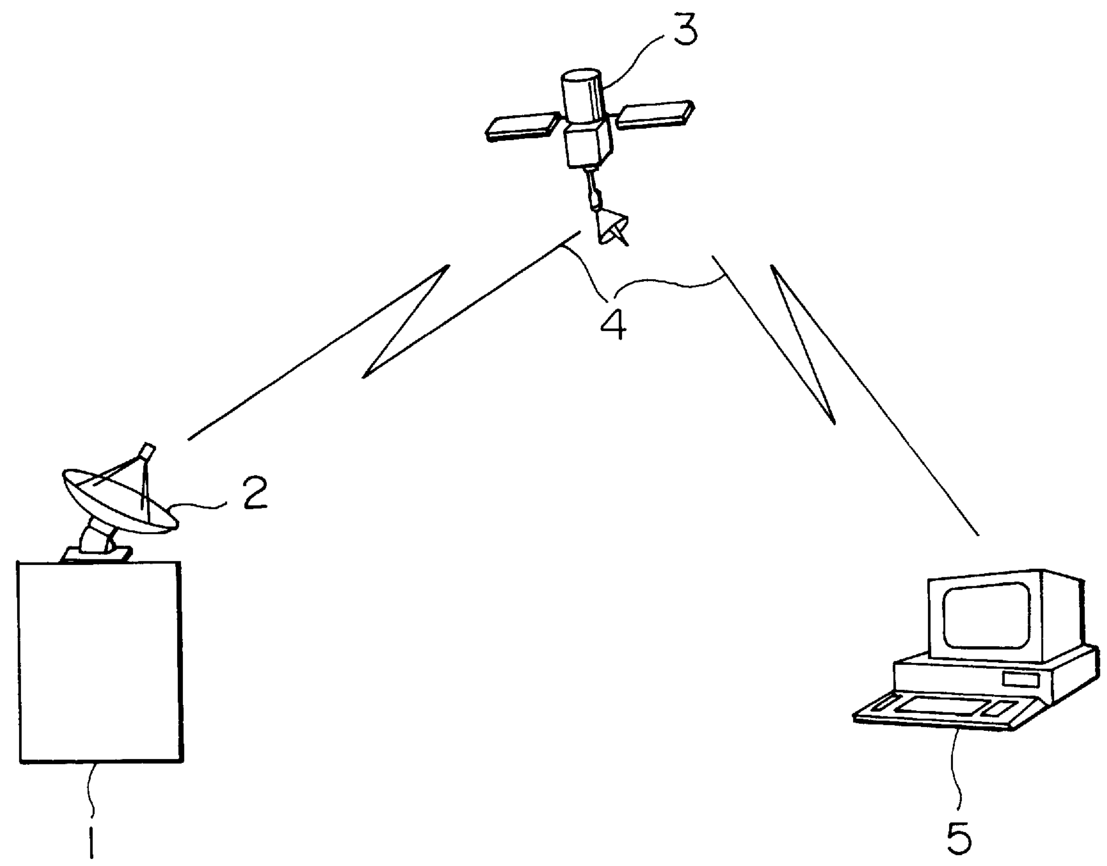
FIG. 1 shows an example of the configuration of an information supply system of the present invention.

FIG. 1 shows an example of the configuration of an information supply system of the present invention. An information provider 1 transmits information from an antenna 2 to a satellite 3 by radio waves. The satellite 3 is designed to receive information transmitted from the antenna 2 by radio waves, and transmit the information to a user terminal 5. As described above, the information provider 1 is connected to the user terminal 5 via a satellite line 4.

Figure 2:
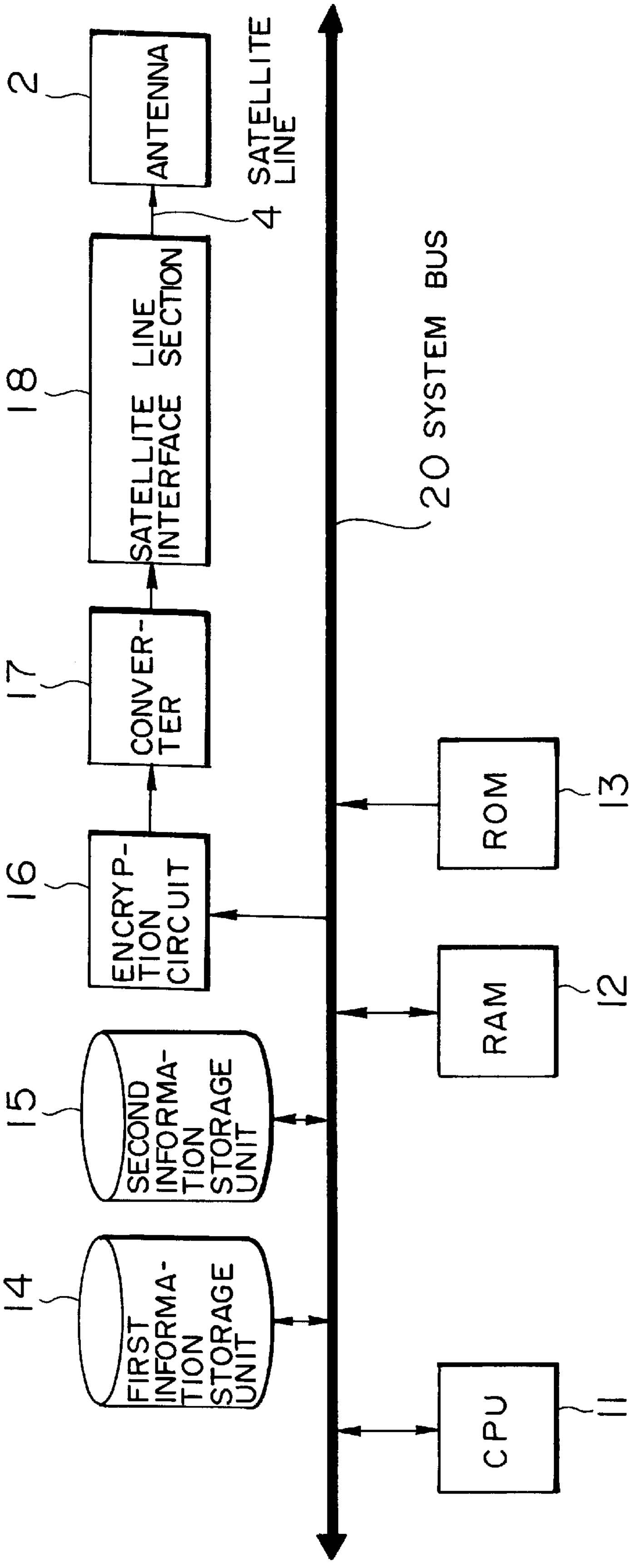
FIG. 2 is a block diagram illustrating an example of the construction of the information provider shown in FIG. 1.

FIG. 2 is a block diagram illustrating an example of the construction of a server on the information provider 1 side. A ROM (Read Only Memory) 13 has stored therein predetermined control programs, control information, and the like. A CPU (Central Processing Unit) 11 (addition means) is designed to perform various processes on the basis of the control programs stored in the ROM 13. A RAM (Random Access Memory) 12 appropriately stores data required for the CPU 11 to perform various programs, information on the current operating state, and work data required for processing. A system bus 20 is composed of a data bus, an address bus, and a control bus.

A first information storage unit 14 (storage means) stores various information to be transmitted to the terminal 5. A second information storage unit 15 stores account information for each user, as well as telephone numbers, and information on the characteristics and tastes of the individual users.

An encryption circuit 16 encrypts information, which is stored in the first information storage unit 14, supplied through the system bus 20 from the CPU 11. A converter 17 converts parallel data corresponding to the encrypted information to serial data. A satellite line interface section 18 performs interfacing with the satellite line 4, for example, converting (modulating) serial data supplied from the converter 17 into signals of a predetermined frequency, and sends out the signals to the antenna 2 (transmission means). The antenna 2 radiates signals supplied from the satellite line interface section 18 by radio waves.

Figure 3:
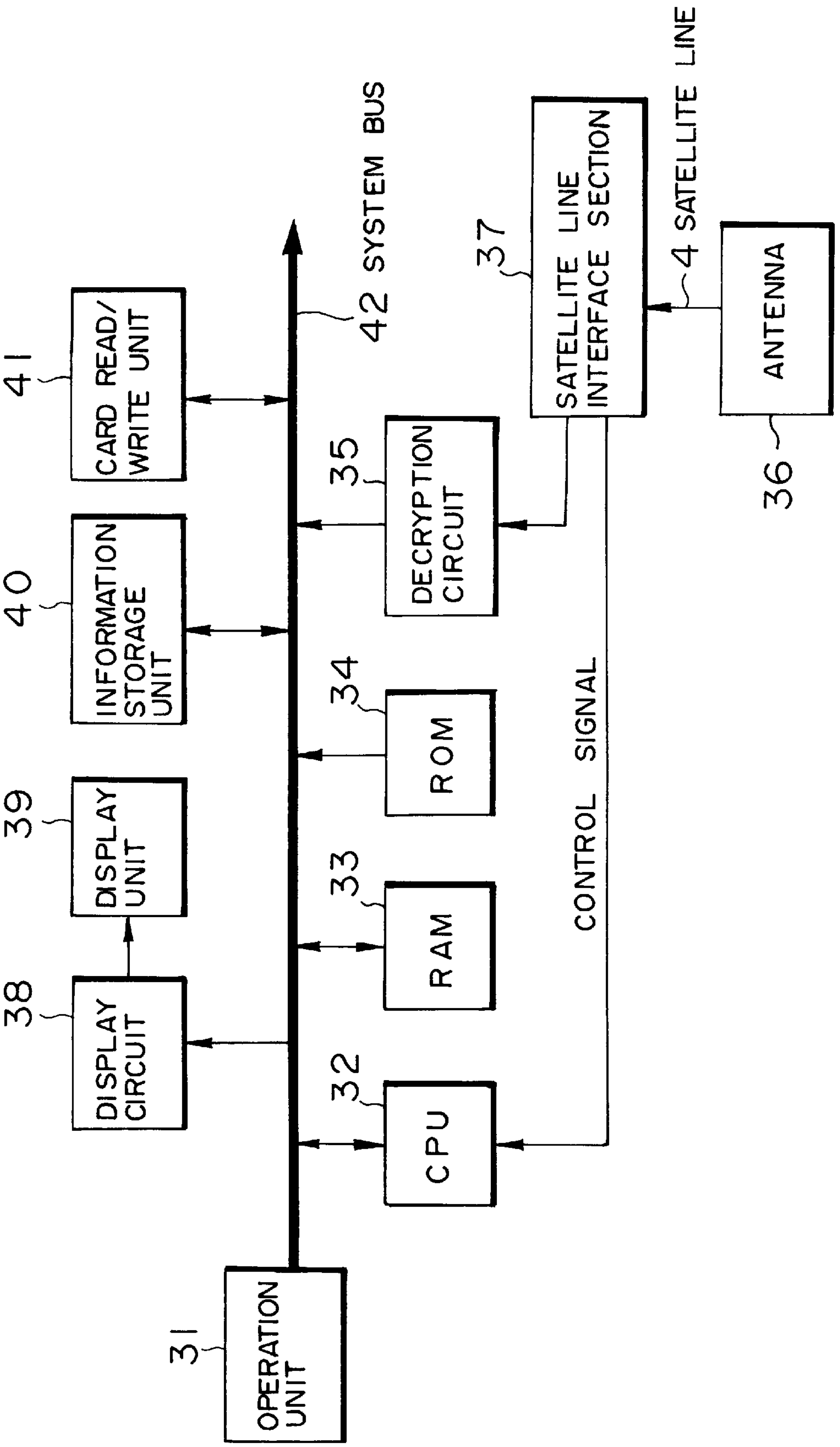
FIG. 3 is a block diagram illustrating an example of the construction of a user terminal 5 shown in FIG. 1.

FIG. 3 is a block diagram illustrating an example of the construction of the user terminal 5. A ROM 34 has stored therein predetermined control programs, control information, or the like. A CPU 32 (setting means, control means) performs various processes in accordance with the control programs stored in the ROM 34. A RAM 33 appropriately stores data required for the CPU 11 to perform various programs, information on the current operating state, and work data required for processing. A system bus 42 is composed of a data bus, an address bus, and a control bus.

An antenna 36 (receiving means) receives radio waves which are sent out from the satellite 3, converts the radio waves into corresponding signals, and then transmits the signals to the satellite line 4. A satellite line interface section 37 converts and outputs the frequency of the signals supplied from the antenna 36 through the satellite line 4. A decryption circuit 35 decrypts the information corresponding to the signals supplied from the satellite line interface section 37, and outputs the signals.

An information storage unit 40 (storage means) stores information from the decryption circuit 35. A display circuit 38 converts information read out from the information storage unit 40 into a display image and further converts the image into RGB signals, after which the display circuit 38 outputs the signals. A display unit 39 (display means) displays an image corresponding to the RGB signals from the display circuit 38.

An operation unit 31 (input means) is composed of a keyboard or the like, and is operated when a predetermined command is input. A card read/write unit 41 reads ID cards (memory cards) (not shown) for identifying a person.

Next, the operation of the information supply system will be described by using a case in which information from the information provider 1 is sent out to the user terminal 5 via the satellite 3. Initially, the CPU 11 of the server on the information provider 1 side performs a predetermined process in accordance with a control program stored in the ROM 13, causing predetermined information to be read out in sequence from the first information storage unit 14 according to a preset transmission schedule. This transmission schedule may be stored, for example, in the second information storage unit 15.

When predetermined information is read out from the first information storage unit 14 by the CPU 11 according to the transmission schedule, the information is supplied to the encryption circuit 16 via the system bus 20. The signals supplied to the encryption circuit 16 are encrypted thereby, and then supplied to the converter 17. The encrypted signals supplied to the converter 17 are converted into serial data thereby, and supplied to the satellite line interface section 18.

Figure 4:
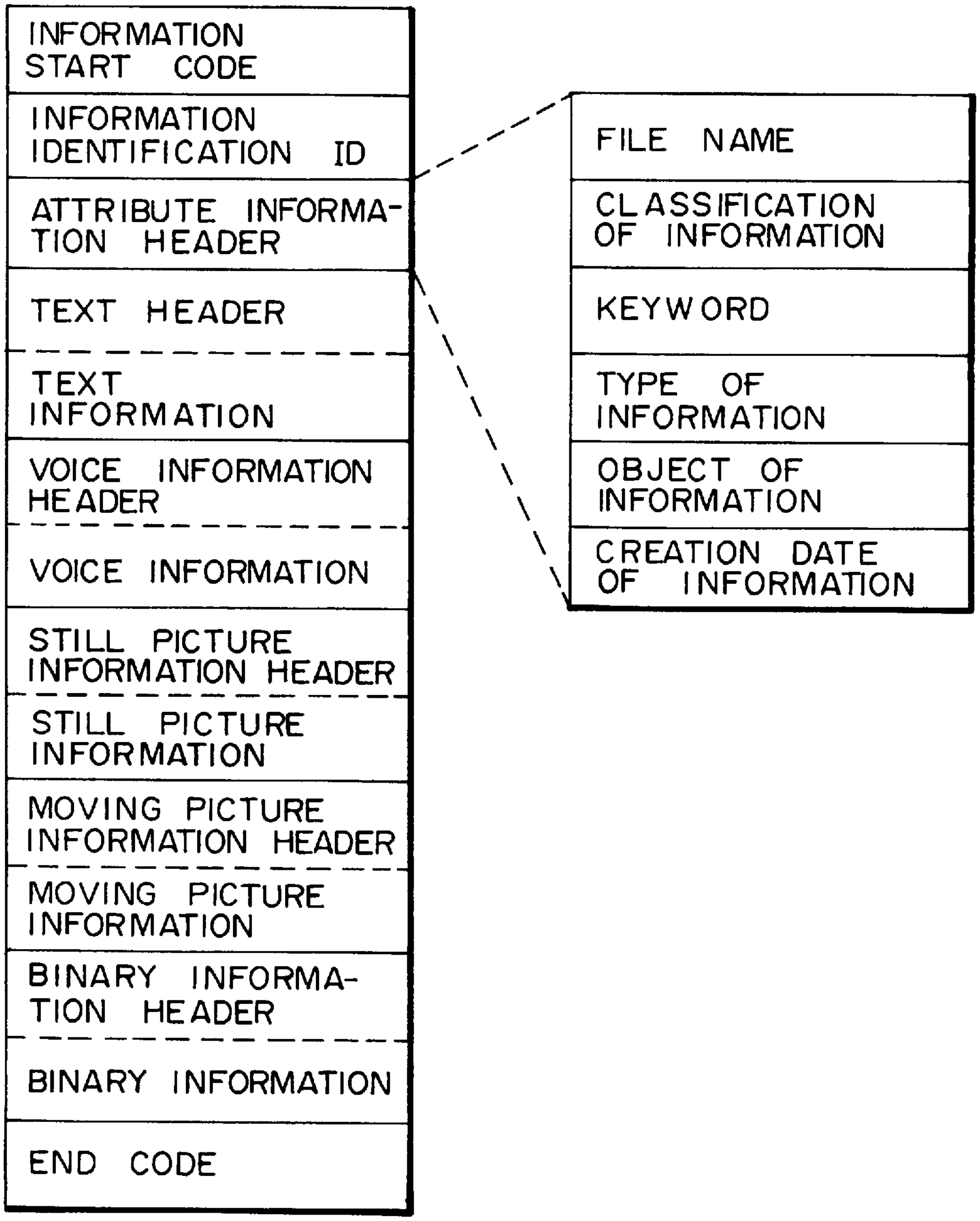
FIG. 4 shows a format of the information transmitted from an information provider 1.

FIG. 4 shows a format of the information corresponding to the signals supplied to the satellite line interface section 18 from the converter 17. The information start code indicates the beginning of the information. The information identification ID is composed of unique identification numbers which are individually assigned to each item of all of the information or the like. The attribute information header indicates the contents of the information, and is composed of a file name, the classification (genre) of information, a keyword, the type of information, objects of information (the age, sex or the like of the subject user), and the date of the creation of the information. The user is able to recognize the outline of the contents of the information due to the attribute information header, and thus is able to select the desired information.

The text header indicates that the information which follows is text information. Therefore, text information is inserted in the following. The voice information header indicates the information which follows is voice information. The voice information header includes a compression method, a sampling frequency, and information on whether the signals are stereo or monaural. Next, voice information is inserted. The still picture information header indicates that the next information is still picture information. The still picture information header includes a method, such as a compression method, a format, a resolution, and information on the number of pixels. Next, the still picture information is inserted.

The moving picture information header indicates that the next information is moving picture information. The moving picture information header includes a method, such as a compression method, a format, a resolution, and information on the number of pixels. Next, the moving picture information is inserted. The binary information header indicates that the next information is binary information (e.g., the execution form of a program). The binary information header also includes the format of binary information, and an object therefor, namely, information on the type of a terminal which is capable of using such binary information. The end code indicates the end of the information.

The satellite line interface section 18 performs a predetermined interfacing process, and sends out the signals supplied thereto to the satellite line 4. The signals sent out to the satellite line 4 are transmitted from the antenna 2 by radio waves. The radio waves transmitted from the antenna 2 are received by the satellite 3, and amplified thereby, after which the radio waves are transmitted to the user terminal 5.

Figure 5:
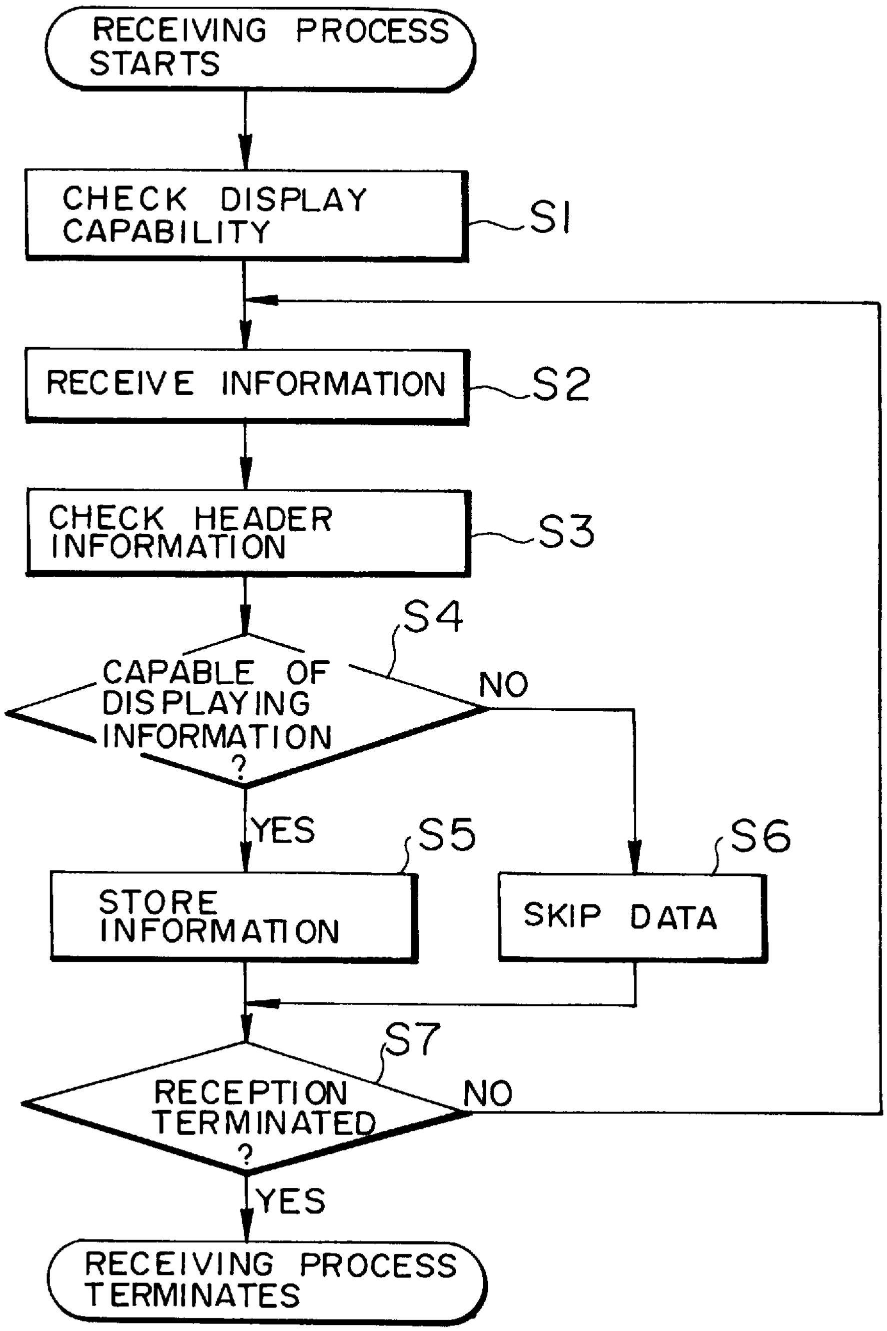
FIG. 5 is a flowchart illustrating the procedural steps in a case in which information from the information provider 1 is received in the user terminal 5.

Next, with reference to the flowchart shown in FIG. 5, a description will be given of the operation in a case in which the user terminal (the receiving terminal) 5 receives provided information transmitted from the information provider 1 via the satellite 3, and records the contents thereof. Here, the case will be described in which information of the received information which cannot be displayed on the display unit 39 of the receiving terminal 5 is not stored, but abandoned, and information which can be displayed, other than the above information, is selectively recorded in the information storage unit 40.

Initially, in step S1, the CPU 32 of the receiving terminal 5 performs a predetermined control program in order to check the display capability of the display unit 39, for example, the resolution or the number of pixels of an image which can be displayed.

Next, in the subsequent step 2, information transmitted from the satellite 3 is received. That is, the radio waves transmitted from the satellite 3 are received by the antenna 36, and converted into corresponding signals, after which the signals are supplied to the satellite line interface section 37. The signals which have been supplied to the satellite line interface section 37 are frequency-converted (demodulated) and converted into corresponding digital information, after which the information is supplied to the decryption circuit 35 where the information supplied from the satellite line interface section 37 is decrypted. Next, the CPU 32 reads the information decrypted by the decryption circuit 35.

As described above, the information read out by the CPU 32 is in a format shown in FIG. 4. Therefore, the CPU 32 makes a determination whether or not the information can be displayed on the display unit 39 of the receiving terminal 5 by checking the header information for each item of information. For example, a determination is made as to whether the resolution and the number of pixels of the information exceed the display capability of the display unit 39. When the information exceeds (is incapable of displaying the information) the display capability of the display unit 39, since a display cannot be made on the display unit 39, the process proceeds to step S6 where this information is not stored in the information storage unit 40, but the information is skipped. Thereafter, the process proceeds to step S7.

When, on the other hand, it is determined in step S4 that the information does not exceed (is capable of displaying the information) the display capability of the display unit 39, since a display can be made on the display unit 39, the process proceeds to step S5 where this information is supplied by the CPU 32 to the information storage unit 40 via the system bus 42 and stored therein.

Next, a check is made in step S7 to determine if the reception of information has been terminated. When it is determined that the reception of information has not yet been terminated, the process returns to step S2, and the processes of steps S2 to S7 are repeatedly performed. On the other hand, when the reception of information has been terminated, the process is terminated.

As a result, only the information which can be displayed by the display unit 39 of the receiving terminal 5 is recorded in the information storage unit 40. Therefore, information which is useless for the receiving terminal 5 is not recorded, and thus it becomes possible to efficiently use the information storage unit 40.

Although in this embodiment the received information is selectively stored in the information storage unit 40 according to the display capability of the receiving terminal 5, in a case in which the information received by the receiving terminal 5 is binary information, it is possible to selectively store such information in the information storage unit 40 depending upon whether the receiving terminal 5 is a terminal targeted by the binary information written in the binary information header.

Figure 6:
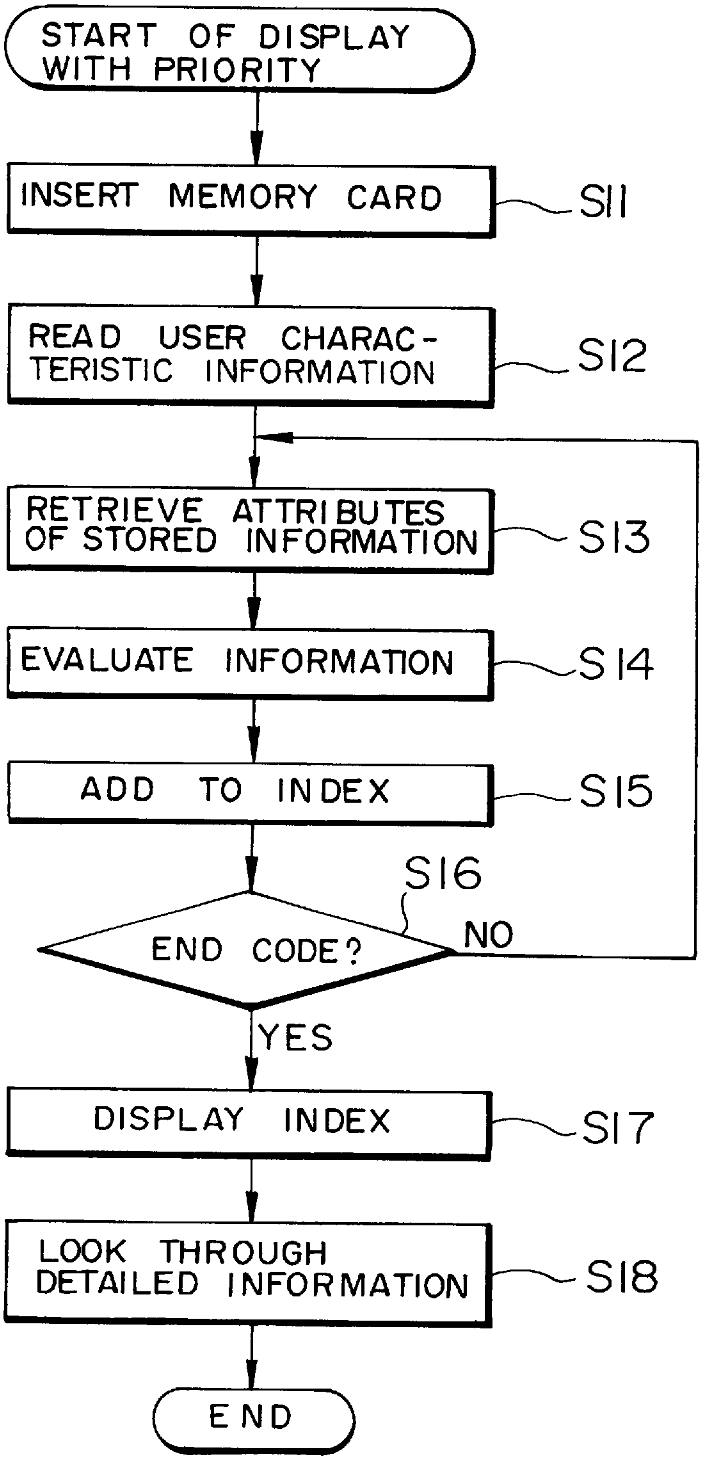
FIG. 6 is a flowchart illustrating the procedural steps in a case in which the user looks through predetermined information stored in an information storage unit 40.

Next, with reference to the flowchart shown in FIG. 6, a description will be given of the control procedure in which a priority is given in the above-described way to the information stored in the information storage unit 40 of the receiving terminal 5, and such priority is displayed.

The user in advance inputs the classification (genre) of information desired by the user, the age, sex, hobbies, and interests of the user, a keyword, and the priority set for each classification of information as the characteristic information of the user by inserting a memory card (not shown) into the card read/write unit 41 shown in FIG. 3 and by operating the operation unit 31. For example, the priority of news from among the classifications of information is set to be the highest, then the priority of information on stock prices is set to be the next highest in priority to the news, and then the priority of the information on hobbies is set to be the next highest in priority to the information on stock prices. The input characteristic information is supplied by the CPU 32 to the card read/write unit 41 via the system bus 42, and is recorded in a memory card or the like.

In step S11, the user inserts a memory card in which the characteristic information of the user is recorded in the above-described manner into the card read/write unit 41 of the receiving terminal 5. Next, the process proceeds to step S12 where the card read/write unit 41 controlled by the CPU 32 reads out the characteristic information of the user from the memory card and supplies the characteristic information to the CPU 32. Next, the process proceeds to step S13 where the CPU 32 retrieves the attribute information header of the information stored in the information storage unit 40.

In step S14, the information corresponding to the attribute information header retrieved in step S13 is evaluated on the basis of the characteristic information of the user read out in step S12. As an evaluation method, for example, of the classifications of the information, the item in which the highest priority is set is given 10 points, the item in which the next highest priority is set is given 5 points, the item in which the next highest priority is set is given 2 points, and the remaining item is given 0 points. In this way, priorities are set beforehand for each classification (genre) of information.

In a case in which, for example, the age and sex of the user entered in the memory card by the user are compared with the contents of the item "objects of information" of the attribute information header retrieved in step S13, namely, the age and sex of the subject user, and when they match each other, 5 points are added, and when they do not match each other, 0 points are added. When the keyword stored in the memory card beforehand by the user matches the contents of the item "keyword" of the attribute information header, 5 points are added, and when they do not match each other, 0 points are added. Similarly, when the hobbies stored in the memory card beforehand by the user match the contents of the item "type of information" of the attribute information header, 5 points are added, and when they do not match each other, 0 points are added. It is shown that the greater the number of points, the higher the priority.

Next, the process proceeds to step S15 where a header corresponding to the information is added to the index on the basis of the number of points added up by such evaluations so that, for example, the items are arranged in an ascending order of the number of points. In step S16, a check is made to determine if an end code indicating the end of data of the information storage unit 40 has been detected. When it is determined that the end code has not been detected, the process returns to step S13, and the processes of step S13 to S16 are repeatedly performed. In this way, the above steps are performed on all the information recorded in the information storage unit 40. As a result, an index is created such that the headings of the corresponding information are arranged in an ascending order of the number of points.

Figure 7:
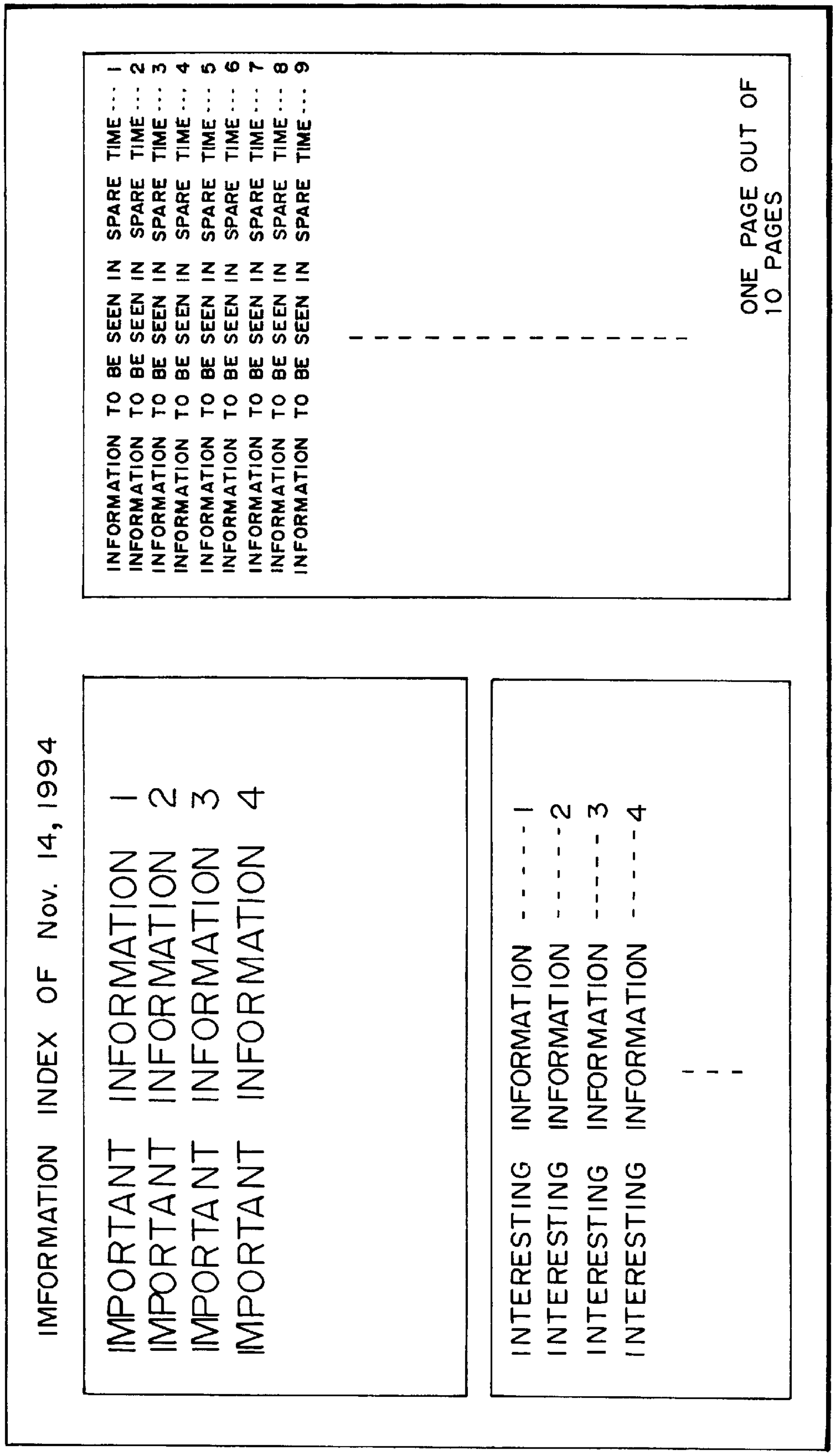
FIG. 7 shows an index displayed on a display unit 39.

On the other hand, when the end code has been detected, the process proceeds to step S17, and the index created in step S15 is displayed on the display unit 39. At this time, it is possible to vary the size of the font displayed in correspondence with the priority displayed in the number of points of the information. For example, as shown in FIG. 7, it is possible that the higher the priority (the greater the number of points), the greater font may be used to make a display. As a result, it is possible to display an efficient index which corresponds to the characteristic information of the user and which is easy for the user to look at.

Next, in step S18, the user selects a desired heading from the index displayed on the display unit 39 by operating the operation unit 31, and the information corresponding to the selected heading is displayed on the screen of the display unit 39. In this way, the user is able to efficiently retrieve the desired information and look through it.

Although in the above-described embodiment information is selectively stored in the information storage unit 40 according to the display capability of the display unit, it is also possible to selectively store information in the information storage unit 40 according to the storage capability, i.e., the storage capacity, of the information storage unit 40. In such a case, information being higher than a predetermined priority is stored in the information storage unit 40 in proportion to the storage capacity of the information storage unit 40. As a result, it is possible to selectively store predetermined information within a range which does not exceed the information storage capability of each user terminal 5.

Further, although in the above-described embodiment the information provider 1 provides information to the terminal 5 via the satellite line 4, it is also possible to provide information via ground waves, networks, CATVs (Cable Television), or CD-ROMs (Compact Disk Read Only Memory), or other transmission media.

According to the information supply system described, it is possible to easily recognize the contents of the information, since classification information is added to information by the addition means of a server, this information is stored by the storage means, and the information to which classification information has been added and which has been stored in the storage means is transmitted by transmission means. Therefore, it becomes possible for the server to create information to be provided and transmit such information without being influenced by the display capability and the storage capacity of the terminal. Also, the terminal is able to instantly cope with the change in the display capability by making the terminal have storage capability appropriate to the display capability.

According to the information supply system described, since a priority is set in information by setting means, and the control means selectively stores predetermined information from the server in the storage means and displays the information from the server on the display means on the basis of such priority, it is possible to vary the method of storing information and the method of displaying such information according to the information. Therefore, since necessary information from among the received information is selectively recorded in the terminal, and the index is displayed such that the headings thereof are arranged in sequence, for example, in an ascending order of the priority, it becomes possible for the user to efficiently search for and obtain desired information.

According to the information supply system described, since user information is recorded in a removable recording medium and the user information is input by input means, even in a case in which a plurality of users use a single terminal, it is possible for the users to easily obtain from the terminal information corresponding to the characteristics and tastes of the user him/herself merely by setting a dedicated recording medium in the terminal.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An information supply system which transmits multimedia information from a server to a plurality of user terminals, wherein information is transmitted, in only one direction, from said server to said user terminals such that said server transmits the same said multimedia information to each user terminal regardless of information normally transmitted from said user terminal to said server, said server comprising:

addition means for adding classification information to said multimedia information indicating the type and importance of portions of said multimedia information;

transmission means for transmitting to each user terminal the same said multimedia information to which said classification information has been added;

a respective user terminal operated by a respective user comprising:

receiving means for receiving said multimedia information transmitted from said server;

input means for inputting user information about said respective user;

setting means for setting priorities for different portions of said multimedia information on the basis of comparing said user information to said classification information; and display means for displaying said portions of multimedia information according to said priorities.

2. The information supply system according to claim 1, wherein said respective user terminal further comprises storage means for selectively storing therein said portions of said multimedia information on the basis of said priorities set by said setting means.

3. The information supply system according to claim 2, wherein said display means has a display capability of displaying said multimedia information at a predetermined resolution and number of pixels, wherein said display means causes said storage means to selectively store therein said portions of said multimedia information having a resolution and number of pixels within said display capability and skipping said portions which exceed said display capability.

4. The information supply system according to claim 1, wherein said server transmits said multimedia information via a satellite, wherein said server further comprises satellite line interface means for interfacing said server to said satellite.

5. The information supply system according to claim 4, wherein said satellite line interface means formats said multimedia information into a satellite processible signal having an identification ID, audio information and video information; wherein said addition means adds said classification information to said identification ID.

6. The information supply system according to claim 5, wherein said satellite line interface means further formats said multimedia information into text information, voice information, still picture information and moving picture information.

7. The information supply system according to claim 1, wherein said user information input by said input means includes genre information desired by the respective user as well as the respective user's age, sex, hobbies and interests.

8. The information supply system according to claim 7, wherein said input means reads said user information from a memory card retained by the respective user.

9. The information supply system according to claim 7, wherein said setting means establishes said priorities by adding points for said portions of multimedia information whose said classification information matches said user information.

10. The information supply system according to claim 9, wherein said display means displays said multimedia information which has a higher priority in a larger font than said multimedia information which has a lower priority.

11. An information supply method which transmits multimedia information from a server to a plurality of user terminals, wherein information is transmitted, in only one direction, from said server to said user terminals such that said server transmits the same said multimedia information to each user terminal regardless of information normally transmitted from said user terminal to said server, comprising the steps of:

adding classification information to said multimedia information indicating the type and importance of portions of said multimedia information;

storing said multimedia information to which said classification information has been added;

transmitting to each user terminal the same said multimedia information to which said classification information has been added and stored;

receiving at a respective user terminal operated by a respective user said multimedia information transmitted from said server;

inputting user information about said respective user;

setting priorities for different portions of said multimedia information received by said respective user terminal on the basis of comparing said user information to said classification information; and displaying said portions of multimedia information received by said respective user terminal according to said priorities.

12. The information supply method according to claim 11, further comprising the step of selectively storing said portions of said multimedia information received by said respective user terminal on the basis of said priorities.

13. The information supply method according to claim 12, wherein said step of displaying displays said portions of multimedia information on a display having a display capability of displaying a predetermined resolution and number of pixels, wherein said step of selectively storing stores each portion of said multimedia information having a resolution and number of pixels within said display capability and skipping said portions which exceed said display capability.

14. The information supply method according to claim 11, wherein said step of transmitting transmits said multimedia information via a satellite and further comprising the step of interfacing said server to said satellite.

15. The information supply method according to claim 14, wherein said step of interfacing formats said multimedia information into a satellite processible signal having an identification ID, audio information and video information; wherein said step of adding adds said classification material to said identification ID.

16. The information supply method according to claim 15, wherein said step of interfacing further formats said multimedia information into text information, voice information, still picture information and moving picture information.

17. The information supply method according to claim 11, wherein said step of inputting further inputs genre information desired by the respective user, as well as the respective user's age, sex, hobbies and interests.

18. The information supply method according to claim 17, wherein said step of inputting reads said user information from a memory card retained by the respective user.

19. The information supply system according to claim 17, wherein said step of setting establishes said priorities by adding points for said portions of multimedia information whose said classification information matches said user information.

20. The information supply method according to claim 19, wherein said step of displaying displays in a larger font said multimedia information which has a higher priority than said multimedia information which has a lower priority.

* * * * *